(12) United States Patent
Homma et al.

(10) Patent No.: US 9,075,196 B2
(45) Date of Patent: Jul. 7, 2015

(54) OPTICAL FIBER JACKET REMOVER

(75) Inventors: Toshihiko Homma, Kanagawa (JP); Masakazu Fukuda, Kanagawa (JP); Kiyoshi Nakazawa, Kanagawa (JP); Masahiro Hasegawa, Kanagawa (JP)

(73) Assignees: SUMITOMO ELECTRIC INDUSTRIES, LTD., Osaka (JP); SEI Optifrontier Co., Ltd., Yokohama (JP)

( * ) Notice: Subject to any disclaimer, the term of this patent is extended or adjusted under 35 U.S.C. 154(b) by 62 days.

(21) Appl. No.: 13/511,487

(22) PCT Filed: Nov. 22, 2010

(86) PCT No.: PCT/JP2010/070757
§ 371 (c)(1),
(2), (4) Date: May 23, 2012

(87) PCT Pub. No.: WO2011/065314
PCT Pub. Date: Jun. 3, 2011

(65) Prior Publication Data
US 2012/0279359 A1    Nov. 8, 2012

(30) Foreign Application Priority Data
Nov. 25, 2009    (JP) .................................. 2009-267928

(51) Int. Cl.
*H02G 1/12* (2006.01)
*G02B 6/245* (2006.01)
*B25B 7/00* (2006.01)

(52) U.S. Cl.
CPC . *G02B 6/245* (2013.01); *B25B 7/00* (2013.01); *H02G 1/1224* (2013.01); *H02G 1/1275* (2013.01); *H02G 1/1241* (2013.01); *H02G 1/1212* (2013.01)

(58) Field of Classification Search
CPC . H02G 1/1275; H02G 1/1214; H02G 1/1224; H02G 1/1212; H02G 1/1241; B25B 7/00
USPC .................. 81/9.4, 9.51, 9.41–9.44
See application file for complete search history.

(56) References Cited

U.S. PATENT DOCUMENTS 5,033,335 A * 7/1991 Yatsu et al. .................. 81/9.4
5,893,302 A * 4/1999 Strom ........................ 81/9.51
(Continued)

FOREIGN PATENT DOCUMENTS

| CN | 1764853 A | 4/2006 |
|---|---|---|
| JP | 7-5327 A | 1/1995 |

(Continued)

OTHER PUBLICATIONS

Chinese Office Action of the corresponding Chinese Patent Application No. 201080052631.8, dated Sep. 4, 2013.
(Continued)

*Primary Examiner* — Hadi Shakeri
*Assistant Examiner* — Danny Hong
(74) *Attorney, Agent, or Firm* — Global IP Counselors, LLP (57) ABSTRACT

An optical fiber jacket remover draws a glass fiber out from a coating by cutting the coating in a jacket removing portion and moving an optical fiber holding portion away from a jacket remover main unit in a heated state. The jacket removing portion is provided with a heater supporting member on which a heater is mounted. The heater supporting member is accommodated in a recessed receiving portion formed in a case. A heat insulating space is formed between the recessed receiving portion and the heater supporting member. A side surface of the heater supporting member and an inside surface of a lateral wall of the recessed receiving portion are brought into contact with each other via a lateral rib formed on the heater supporting member, and the heat insulating space is thereby blocked.

6 Claims, 8 Drawing Sheets

(56) References Cited

U.S. PATENT DOCUMENTS

| | | | |
|---|---|---|---|
| 6,023,996 A * | 2/2000 | Dodge et al. | 81/9.51 |
| 6,477,310 B1 * | 11/2002 | Dumitriu | 385/147 |
| 6,598,497 B1 * | 7/2003 | Mizushima et al. | 81/9.41 |
| 6,823,761 B2 * | 11/2004 | Chiang et al. | 81/9.51 |
| 2006/0263028 A1 * | 11/2006 | Honma | 385/134 |

FOREIGN PATENT DOCUMENTS

| | | | |
|---|---|---|---|
| JP | 2951359 | B2 | 9/1999 |
| JP | 11-287913 | A | 10/1999 |
| JP | 11-337738 | A | 12/1999 |
| JP | 2000-019331 | A | 1/2000 |
| JP | 2001-108836 | A | 4/2001 |

OTHER PUBLICATIONS

Notice of Preliminary Rejection of the corresponding Korean Patent Application No. 10-2012-7013466, dated Jul. 17, 2013.

Notice of Allowance of the corresponding Korean Patent Application No. 10-2012-7013466, dated Feb. 18, 2014.

* cited by examiner

OPTICAL FIBER JACKET REMOVER

FIELD OF THE INVENTION

The present invention relates to an optical fiber jacket remover.

BACKGROUND

Rapid popularization of Internet use in recent years has increased the need for high-speed data communication, and Fiber To The Home (FTTH) service for laying optical fiber to households is expanding. Common household use of optical connectors for making optical connections is therefore anticipated. For example, an optical communication device in a house may be connected to an FTTH network by removing a coating part of an optical fiber connected to the optical communication device in the household and attaching an optical connector, and inserting the optical connector in an adapter for optical connection.

Optical fiber jacket removers used for such an application are disclosed in Japanese Laid-Open Patent Publication No. 2001-108836 (Patent Literature 1) and Japanese Laid-Open Patent Publication No. 11-337738 (Patent Literature 2). In these optical fiber jacket removers, an end portion of a single-fiber or multifiber coated with a resin is sandwiched in a remover main unit having a heater, and the coating of the end portion of the optical fiber is cut and removed while being heated by the heater.

However, in the optical fiber jacket removers described above, a large pulling force is required to remove the coating when the temperature at which the coating is heated is decreased, and there is a risk of breaking or damaging the optical fiber. Consequently, high power consumption is required to reduce the pulling force. Therefore, in the case that electrical power is supplied by a battery, the short operating time of the battery leads to impair working efficiency.

SUMMARY

An object of the present invention is to provide an optical fiber jacket remover capable of satisfactorily removing a coating without infiltration of water, without breaking or damaging the optical fiber, and with low power consumption.

In order to achieve the abovementioned objects, the present invention provides an optical fiber jacket remover including a jacket remover main unit and an optical fiber holding portion that is provided so as to be able to approach and separate from the jacket remover main unit; the jacket remover main unit including: a case having a jacket removing portion; a heater supporting member housed in a recessed receiving portion formed in the jacket removing portion; a heater mounted to the heater supporting member; and a blade attached to the jacket removing portion; wherein the optical fiber jacket remover draws a glass fiber of an optical fiber out from a coating by cutting the coating in the vicinity of an end portion of an optical fiber through use of the blade, the optical fiber being retained in the optical fiber holding portion, and moving the optical fiber holding portion away from the jacket remover main unit in a state in which the end portion of the optical fiber is heated by the heater. In this optical fiber jacket remover, a space is formed between the recessed receiving portion and the heater supporting member; and a side surface of the heater supporting member and an inside surface of the recessed receiving portion are brought into contact with each other via a rib formed on the heater supporting member or the recessed receiving portion, and the space is thereby blocked.

Preferably, in the optical fiber jacket remover the case has a board receiving portion for housing a circuit board; and a partition between the jacket removing portion and the board receiving portion; and a portion of the heater supporting member is supported by the partition, the heater supporting member has a contacting portion for contacting the partition, and a recessed portion which forms a gap with respect to the partition, and the jacket removing portion and the board receiving portion are partitioned in liquid-tight fashion by the partition. Preferably, a wall portion is provided upright on a bottom part of the recessed receiving portion of the case, and the heater supporting member is supported on the wall portion. Preferably, the space is partitioned in liquid-tight fashion by the wall portion, and wiring connected to the heater is accommodated in one space divided by the wall portion.

Through the optical fiber jacket remover of the present invention, it is possible to reduce the time needed for the heater to reach the optimum temperature for removing the coating of the optical fiber after the power supply to the heater is turned on, and low power consumption can be achieved. The pulling force required to remove the coating can be reduced, and the coating can be removed satisfactorily and smoothly without breaking or damaging the optical fiber. In the case that an internal power supply is used, the service life thereof can be increased, and this enables prolonged operation and a significant enhancement of working efficiency. Even when the optical fiber jacket remover is used outdoors, water can be prevented from infiltrating into the space between the heater supporting member and the recessed receiving portion, and malfunctioning due to water infiltration can be eliminated.

DETAILED DESCRIPTION

Embodiments of the present invention are described below with reference to the drawings. The drawings are included for descriptive purposes only and do not limit the scope of the invention. In order to avoid redundancy in the drawings, the same reference numerals are used for the same components throughout. Dimensional ratios in the drawings are not necessarily accurate.

Figure 1:
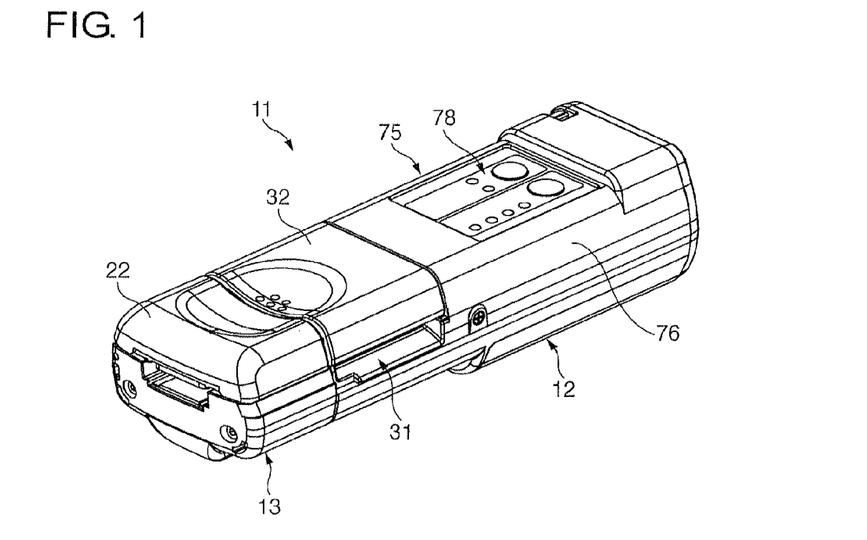
FIG. 1 is a perspective view showing an embodiment of the optical fiber jacket remover according to the present invention.

FIG. 1 is a perspective view showing the optical fiber jacket remover 11 as an embodiment of the present invention. The optical fiber jacket remover 11 has a jacket remover main unit 12, and an optical fiber holder holding portion (optical fiber holding portion) 13 which is connected to one end of the jacket remover main unit 12. The jacket remover main unit 12 has a jacket removing portion 31 at the end thereof to which the optical fiber holder holding portion 13 is connected, and has a power supply portion 75 at the other end thereof. An optical fiber presser lid 32 is provided to a top portion of the jacket removing portion 31 so as to be able to open and close. A holder presser lid 22 is provided to a top portion of the optical fiber holder holding portion 13 so as to be able to open and close.

Figure 2:
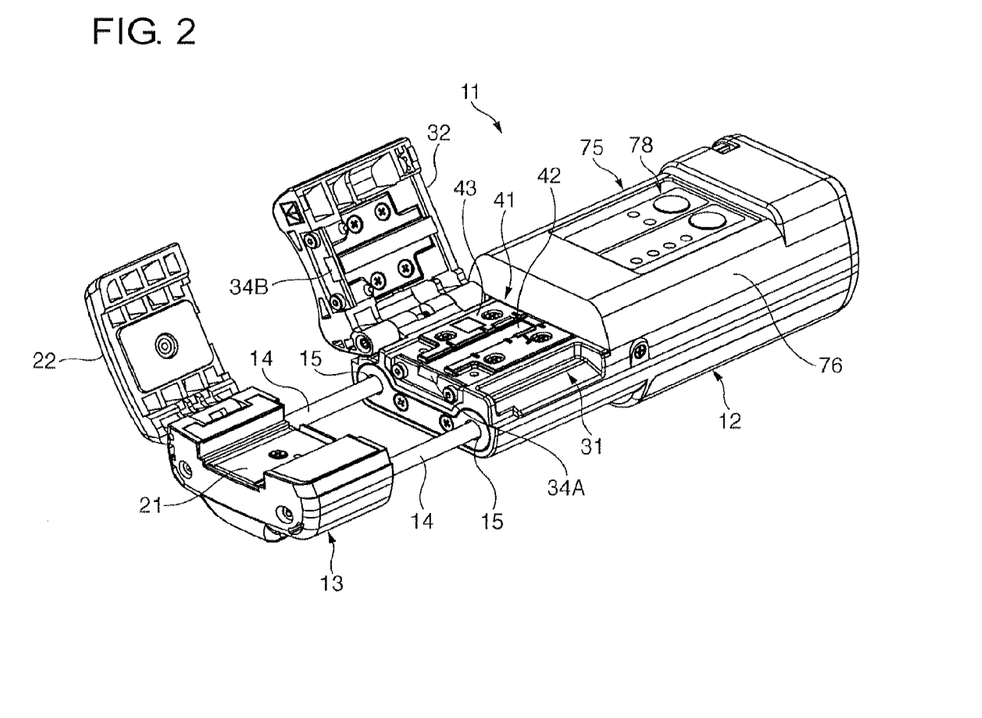
FIG. 2 is a perspective view showing a state in which the holder presser lid and optical fiber presser lid of the optical fiber jacket remover of FIG. 1 are open.

FIG. 2 is a perspective view showing a state in which the holder presser lid 22 and the optical fiber presser lid 32 of the optical fiber jacket remover 11 are open. The optical fiber holder holding portion 13 is provided with two slide shafts 14 extending toward the jacket remover main unit 12, and the slide shafts 14 are slidably inserted into sliding holes 15 of the jacket remover main unit 12. The slide shafts 14 provide the optical fiber holding portion 13 with guided sliding movement between a first position adjacent to the jacket remover main unit 12 (FIG. 1) and a second position spaced apart from the jacket remover main unit 12 (FIG. 2). The optical fiber holder holding portion 13 is thereby able to slide toward and away from the jacket remover main unit 12. The direction in which the optical fiber holder holding portion 13 is moved away from the jacket remover main unit 12 is referred to as the forward direction of the optical fiber jacket remover 11. A holder mount 21 is formed on a top surface of the portion of the optical fiber holder holding portion 13 that is exposed by opening of the holder presser lid 22.

Blades 34A, 34B are attached at the front surface of the top part of the portion of the jacket removing portion 31 exposed by opening of the optical fiber presser lid 32, and at the front surface of the optical fiber presser lid 32 respectively. The jacket removing portion 31 has an optical fiber heating portion 4L The optical fiber heating portion 41 has a plate-shaped heater 42, and a heater supporting member 43 on which the heater 42 is mounted. A heater power switch (not shown) that is switched on and off by the opening and closing of the optical fiber presser lid 32 is provided to the jacket removing portion 3L When the optical fiber presser lid 32 is closed, the heater power switch is turned on, and electrical power is fed to the heater 42.

The power supply portion 75 is provided with an operating unit 78 which has a heater power confirmation LED, a temperature display LED, and various other display LEDs, and a power supply switch, a temperature adjustment switch, and various other switches. A removable cover 76 is provided on the periphery of the operating unit 78 so as to cover a circuit board 77 (FIG. 5) for controlling the supply of current to the heater 42. Four to eight 1.2 to 1.5-volt batteries as internal power supplies can be accommodated in the power supply portion 75.

Figure 3:
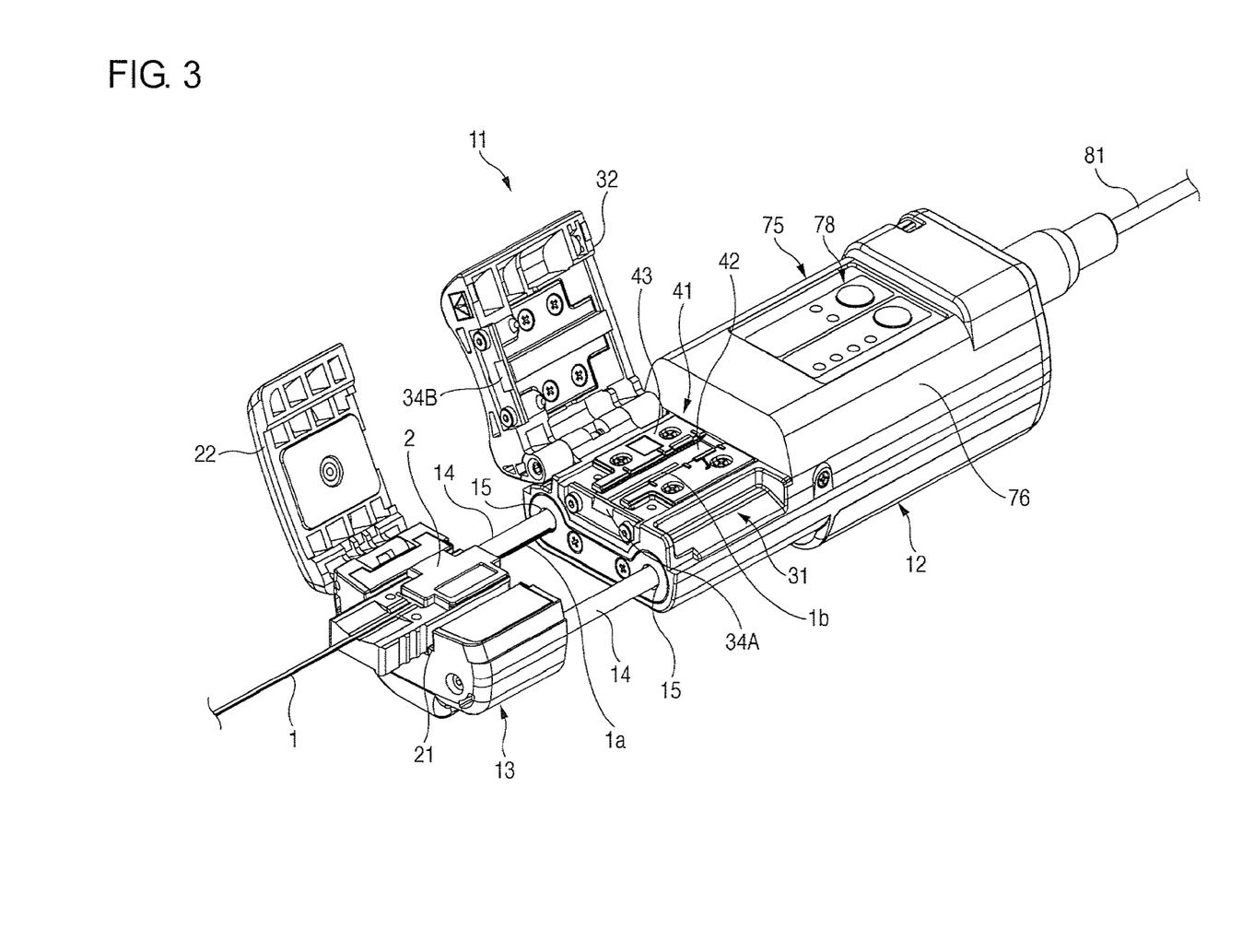
FIG. 3 is a perspective view showing a state in which the fiber holder retaining an optical fiber is set in the optical fiber jacket remover of FIG. 1.

FIG. 3 is a perspective view showing a state in which a fiber holder 2 retaining an optical fiber 1 is set in the optical fiber jacket remover IL In the optical fiber 1, a glass fiber 1a is covered by a resin coating 1b. The portion of the optical fiber 1 near the end portion thereof is retained by the fiber holder 2, and the fiber holder 2 is mounted in the holder mount 21. By closing the holder presser lid 22 in a state in which the fiber holder 2 is mounted in the holder mount 21, the fiber holder 2 is retained in the optical fiber holder holding portion 13. Closing the optical fiber presser lid 32 onto the jacket removing portion 31 causes only the coating lb of the optical fiber 1 to be cut by the blades 34A, 34B. The length of the portion of the coating of the optical fiber 1 to be removed can be determined by adjusting the position in which the optical fiber 1 is mounted in relation to the fiber holder 2. A power supply cord 81 can be plugged into or unplugged from the power supply portion 75, and plugging in the power supply cord 81 enables power to be supplied from an external power supply.

Figure 4:
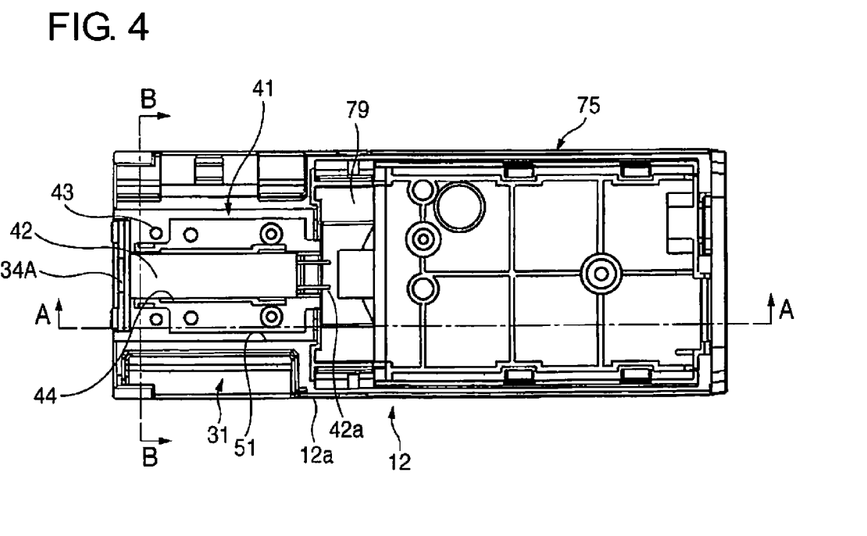
FIG. 4 is a plan view showing a state in which the lid of the jacket remover main unit in the optical fiber jacket remover of FIG. 1 is removed.
Figure 5:
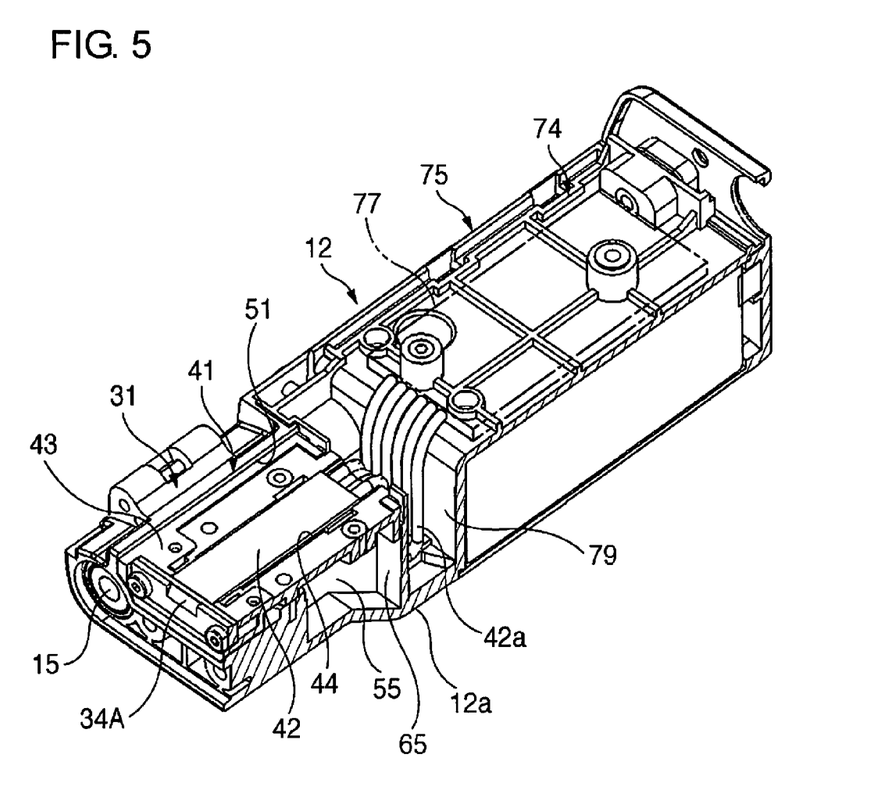
FIG. 5 is a perspective view showing the section along line A-A in FIG. 4.

FIG. 4 is a plan view showing a state in which the lid of the jacket remover main unit 12 is removed. FIG. 5 is a perspective view showing the section along line A-A in FIG. 4. The optical fiber heating portion 41 is accommodated in a recessed receiving portion 51 formed in the jacket removing portion 31 in a case 12a that constitutes the jacket remover main unit 12. A board receiving portion 74 is provided under the cover 76 of the power supply portion 75, and the circuit board 77 for controlling the supply of current to the heater 42 is housed in the board receiving portion 74. A wiring receiving portion 79 in which wiring 42a connected to the heater 42 can be housed is formed on the jacket removing portion 31 side of the power supply portion 75. In the power supply portion 75, the circuit board 77, and the wiring receiving portion 79 are made airtight by attaching the cover 76.

Figure 6:
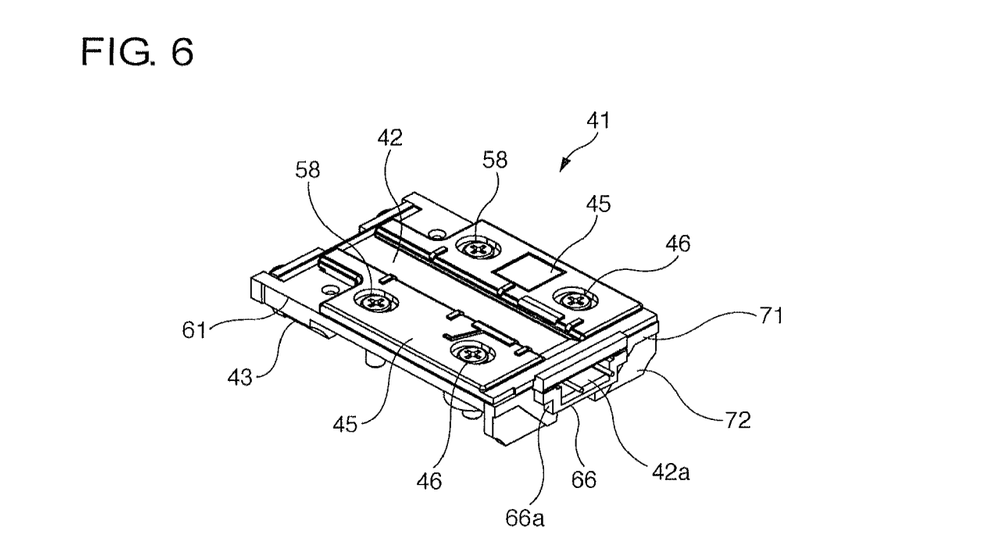
FIG. 6 is a perspective view showing the optical fiber heating portion in the optical fiber jacket remover of FIG. 1 from above.
Figure 7:
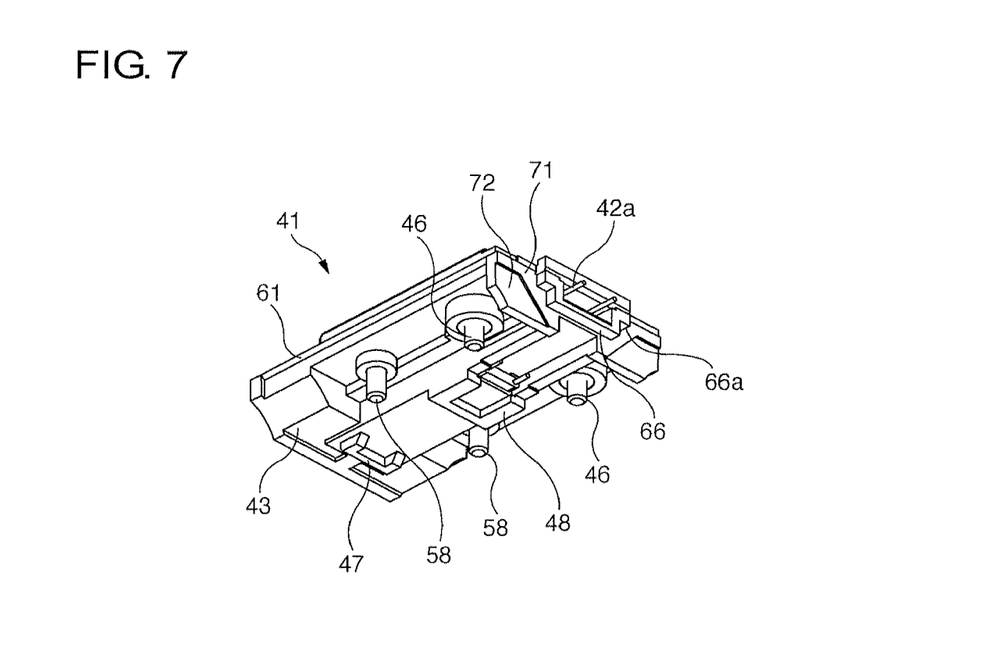
FIG. 7 is a perspective view showing the optical fiber heating portion in the optical fiber jacket remover of FIG. 1 from below.

FIG. 6 is a perspective view showing the optical fiber heating portion 41 from above, and FIG. 7 is a perspective view showing the optical fiber heating portion 41 from below. A receiving groove 44 (FIGS. 4 and 5) extending in the longitudinal direction is formed in the center in the left-right width direction of the top surface of the heater supporting member 43. The heater 42 is housed in the receiving groove 44. Holding members 45 are screwed in a place by screws 46 on both side portions of the receiving groove 44, and the heater 42 is fixed to the heater supporting member 43 by the holding members 45. Engaging ribs 47, 48 which are bracket-shaped or U-shaped in the plan view are formed apart from each other in the longitudinal direction in the center position in the width direction of the bottom surface of the heater supporting member 43. Lateral ribs 61 extending in the front-rear direction are formed on both sides of the heater supporting member 43 in the left-right width direction thereof. A rear end portion of the heater supporting member 43 is formed as a contacting portion 71, and a recessed portion 72 is formed below the contacting portion 71. Furthermore, an engaging portion 66 having step portions 66a at both sides thereof is formed at the rear end of the heater supporting member 43.

Figure 8:
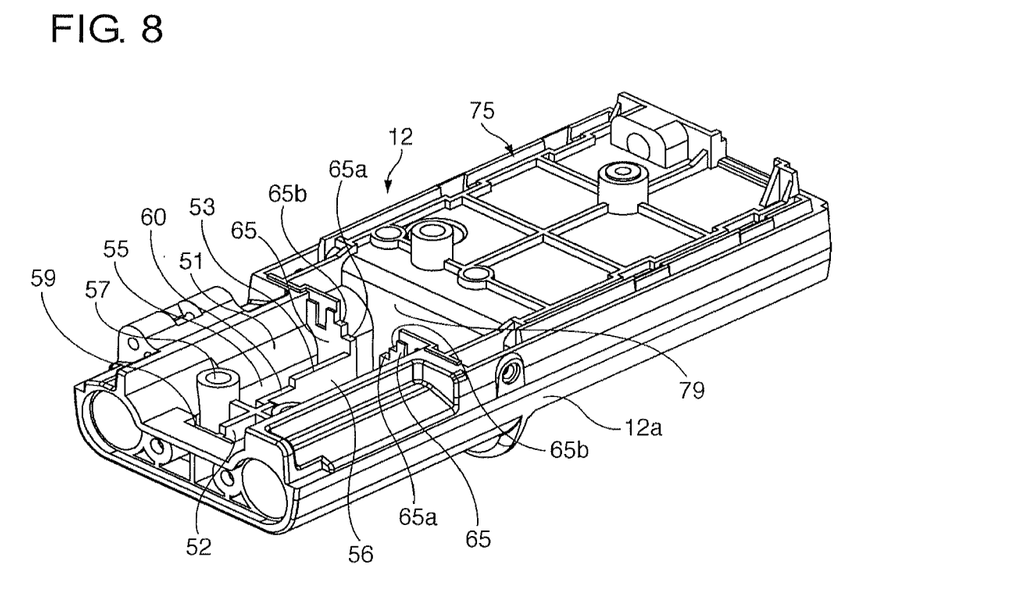
FIG. 8 is a perspective view showing the case which constitutes the jacket remover main unit in the optical fiber jacket remover of FIG. 1 from the front.
Figure 9:
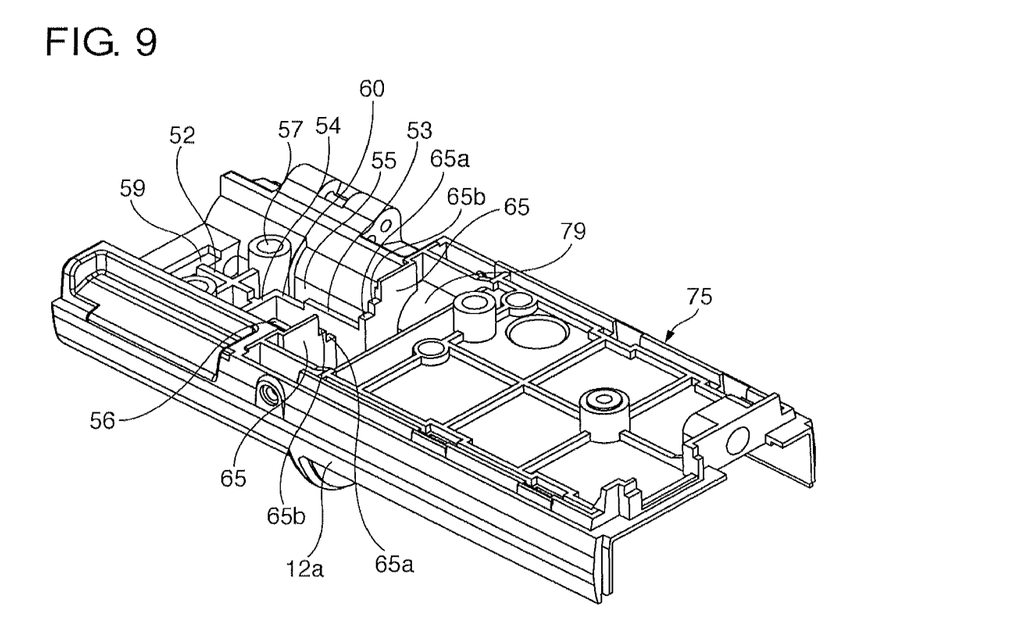
FIG. 9 is a perspective view showing the case which constitutes the jacket remover main unit in the optical fiber jacket remover of FIG. 1 from behind.
Figure 10:
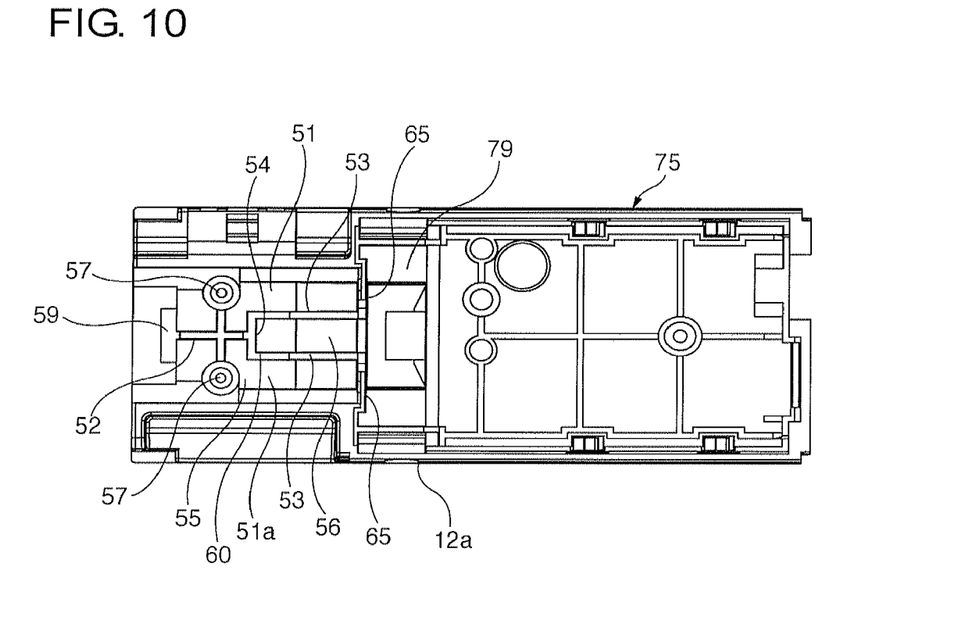
FIG. 10 is a plan view showing the case which constitutes the jacket remover main unit in the optical fiber jacket remover of FIG. 1.

FIG. 8 is a perspective view showing the case 12a which constitutes the jacket remover main unit 12 from the front, and FIG. 9 is a perspective view showing the case 12a which constitutes the jacket remover main unit from behind. FIG. 10 is a plan view showing the case 12a. A lengthwise wall (wall portion) 52 and a pair of lengthwise walls (wall portions) 53 extending in the axial direction of the jacket remover main unit 12 are provided upright on a bottom part 51a of the recessed receiving portion 51. The lengthwise wall 52 is formed on the distal-end side of the jacket remover main unit 12, and the lengthwise walls 53 are formed closer to the rear end side than the lengthwise wall 52.

The lengthwise wall 52 is disposed at the center in the width direction of the jacket remover main unit 12, and the lengthwise walls 53 are disposed apart from each other on either side of the center in the width direction of the jacket remover main unit 12. A widthwise wall (wall portion) 54 connected to end portions of the lengthwise wall 52 and the lengthwise walls 53 is formed between the lengthwise wall 52 and the lengthwise walls 53. A pair of partitions 65 is provided upright on a rear end side of the optical fiber heating portion 41 in the jacket remover main unit 12. Two step portions 65a, 65b having different heights are formed in the top ends of each of the partitions 65.

In the recessed receiving portion 51, recessed engaging portions 59, 60 are formed in the distal-end side and the rear-end side, respectively, of the lengthwise wall 52.

When the optical fiber heating portion 41 is accommodated in the recessed receiving portion 51, the engaging rib 47 of the heater supporting member 43 engages in the recessed engaging portion 59, and the engaging rib 48 of the heater supporting member 43 engages in the recessed engaging portion 60. The optical fiber heating portion 41 is thereby restricted from moving in the longitudinal direction of the jacket remover main unit 12.

Figure 11:
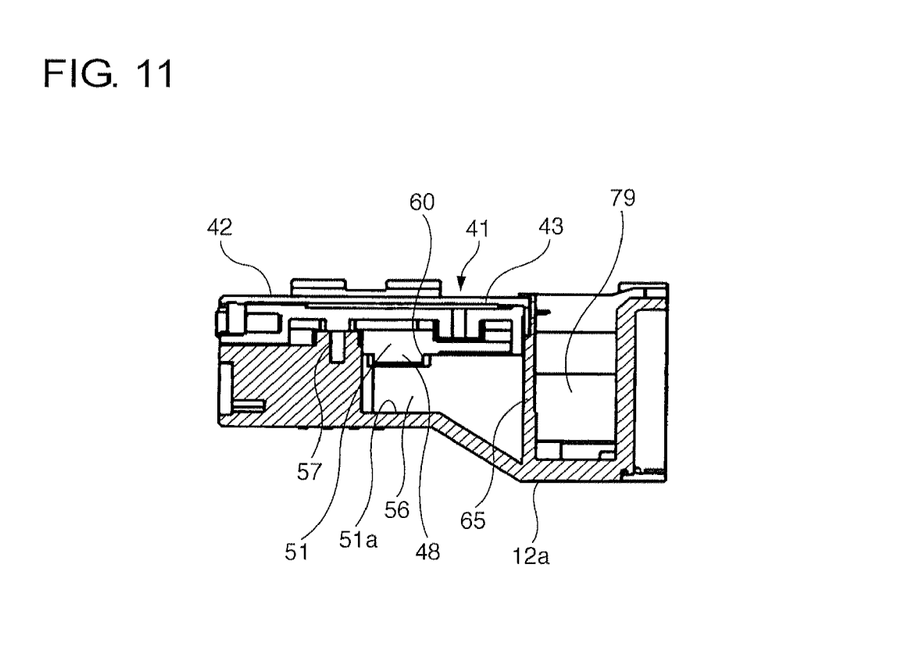
FIG. 11 is a view showing a portion of the section along line A-A in FIG. 4.
Figure 12:
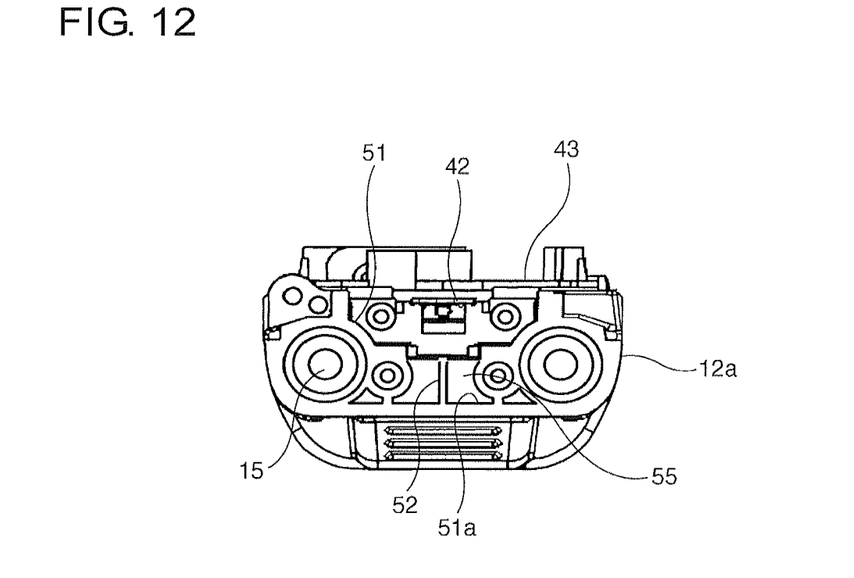
FIG. 12 is a sectional view along line B-B in FIG. 4.

FIG. 11 is a view showing a portion of the section along line A-A in FIG. 4. FIG. 12 is a sectional view along line B-B in FIG. 4. The optical fiber heating portion 41 mounted on the top ends of the lengthwise walls 52, 53 and the widthwise wall 54 is accommodated in the recessed receiving portion 51. A heat insulating space (space) 55 is thereby formed between the heater supporting member 43 and the case 12a. The space surrounded by the lengthwise walls 53 and the widthwise wall 54 is formed as a wiring space (space) 56, and the wiring 42a (FIGS. 4, 5) connected to the heater 42 can be accommodated in the wiring space 56. The heat insulating space 55 and the wiring space 56 are partitioned in liquid-tight fashion by the lengthwise walls 53 and the widthwise wall 54. Female screw parts 57 are formed on both sides of the lengthwise wall 52 in the recessed receiving portion 51 (FIGS. 8, 9, and 10), and screws 58 are screwed into the female screw parts 57 to fix the heater supporting member 43 to the case 12a.

Figure 13:
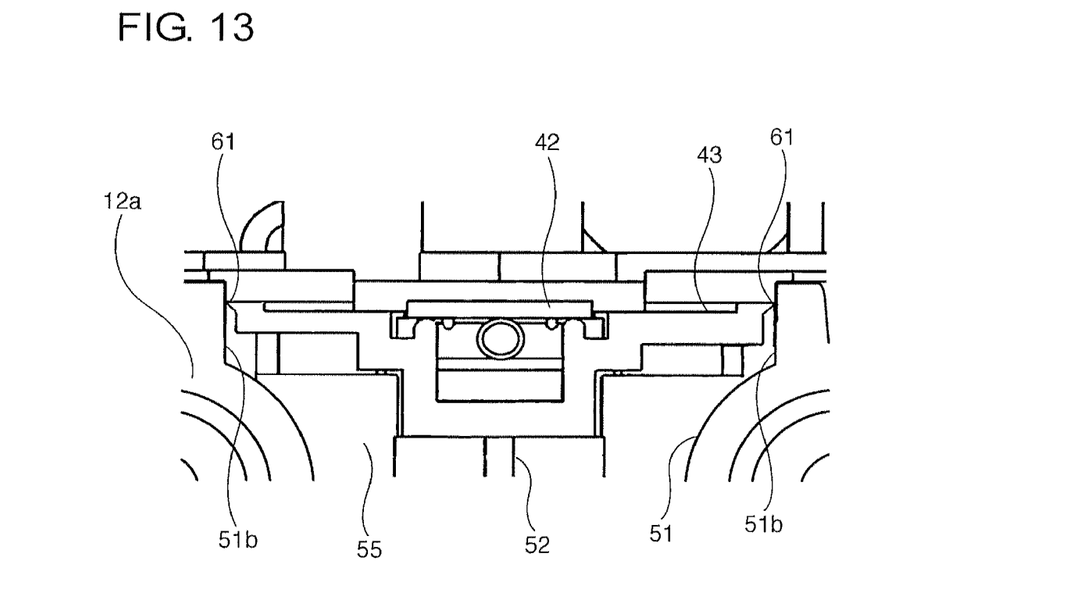
FIG. 13 is a partial enlarged view of FIG. 12.

FIG. 13 is a partial enlarged view of FIG. 12. In a state in which the heater supporting member 43 is accommodated in the recessed receiving portion 51, distal ends of the lateral ribs 61 formed on both sides thereof contact inside surfaces of lateral walls 51b which form the recessed receiving portion 51 of the case 12a, and the heat insulating space 55 and the wiring space 56 are thereby blocked and the heater supporting member 43 is positioned. The lateral ribs 61 are formed having a significantly smaller wall thickness than the lateral surfaces of the heater supporting member 43. The contacting area of the heater supporting member 43 with the case 12a is thereby minimized.

Figure 14:
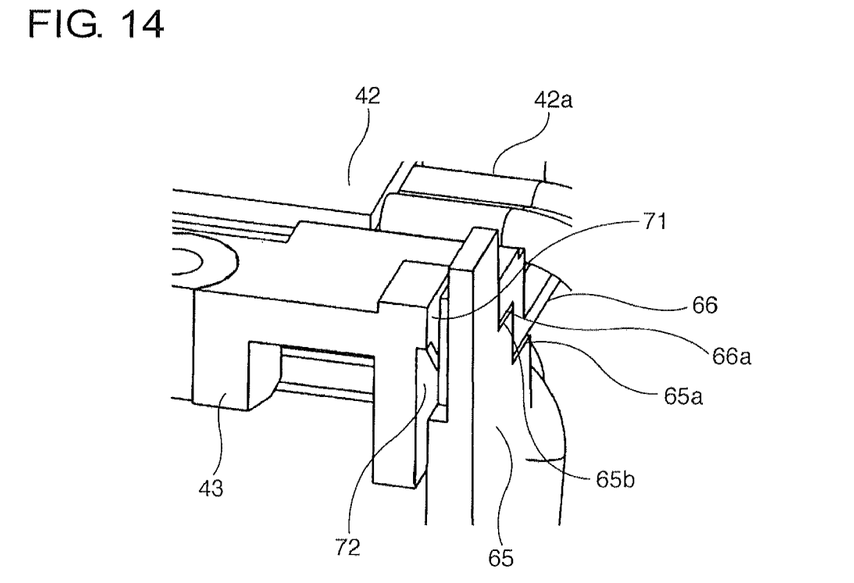
FIG. 14 is an enlarged perspective view showing the rear end side of the jacket removing portion.

FIG. 14 is an enlarged perspective view showing the rear end side of the jacket removing portion. The bottom portion of the engaging portion 66 of the heater supporting member 43 is mounted on the step portions 65a, the step portions 66a of the engaging portion 66 are mounted on the step portions 65b, and the rear end side of the heater supporting member 43 is thereby supported by the partitions 65. The contacting portion 71 of the heater supporting member 43 contacts each of the partitions 65, and the heater supporting member 43 is thereby positioned with respect to the partitions 65, and a gap is formed between the heater supporting member 43 and the partitions 65 in the portion of the heater supporting member 43 where the recessed portion 72 is formed.

In the jacket remover main unit 12, the jacket removing portion 31 and the board receiving portion 74 which includes the wiring receiving portion 79 are partitioned from each other in liquid-tight fashion by the partitions 65. Through this configuration, if moisture enters from the vicinity of the jacket removing portion 31, the moisture can be prevented from infiltrating directly onto the board or into the power supply portion. Furthermore, since the wiring receiving portion 79 also serves as a reservoir, moisture can be even more effectively prevented from infiltrating directly onto the board or into the power supply portion. In another preferred configuration, by providing a water drainage hole in the vicinity of the bottom of the wiring receiving portion 79, and by providing a valve in the hole to prevent backflow from the outside, moisture that has entered the inside can easily be removed to the outside.

The method whereby the coating 1b on the end portion of the optical fiber 1 is removed and the glass fiber la is exposed by the optical fiber jacket remover 11 will next be described. First, the optical fiber presser lid 32 and the holder presser lid 22 are opened, and the fiber holder 2 to which the optical fiber 1 is attached is set in the holder mount 21. The distal end of the optical fiber 1 is thereby disposed on the heater 42.

The holder presser lid 22 is then closed, and the optical fiber presser lid 32 is closed. Only the coating 1b of the optical fiber I is then cut by the two blades 34A, 34B. The heater power switch is turned on by the closing of the optical fiber presser lid 32. Power to the heater 42 is turned on. The portion of the coating 1b to be removed from the optical fiber 1 mounted on the heater 42 is then rapidly heated by the heater 42 and softened.

When confirmation has been made via the display LED of the operating unit 78 that the coating 1b of the optical fiber 1 has reached the optimum temperature for jacket removal, the jacket remover main unit 12 and the optical fiber holder holding portion 13 are grasped and the optical fiber holder holding portion 13 is moved in the direction away from the jacket remover main unit 12. Only the heated and softened coating lb toward the distal end from the position of cutting by the two blades 34A, 34B is then removed, and the glass fiber la at the end of the optical fiber 1 is exposed. When the jacket removal operation is completed and the optical fiber presser lid 32 is opened, the heater power switch turns off, power to the heater 42 is stopped, and the heater 42 is prevented from needlessly consuming power while in standby.

Figure 15:
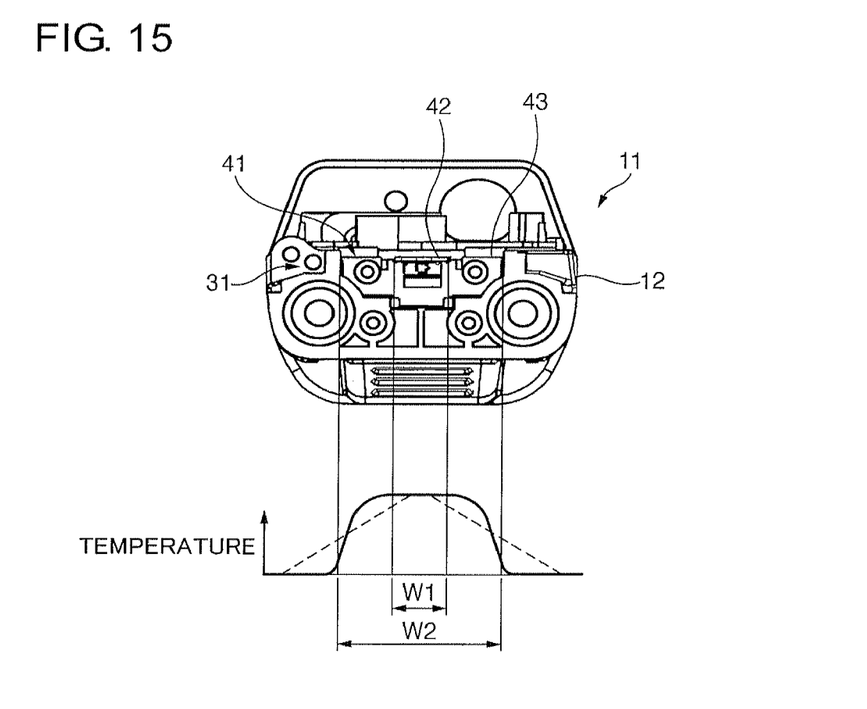
FIG. 15 is a view showing the temperature distribution in the jacket removing portion.

FIG. 15 shows the temperature distribution in the width direction of the optical fiber heating portion 41 when power to the heater 42 is turned on to generate heat. In the optical fiber jacket remover 11 as an embodiment of the present invention, since the heater supporting member 43 contacts the case 12a via the lateral ribs 61 and the contacting area thereof is reduced, and since a heat insulating layer formed by the heat insulating space 55 and wiring space 56 is formed between the case 12a and the heater supporting member 43, a structure is formed in the optical fiber jacket remover 11 whereby the heat of the heater 42 is not readily transferred to the case 12a. Consequently, heat transfer from the heater supporting member 43 (width W2) to the case 12a is suppressed, and a high temperature occurs across the entire width (width WO of the heater 42, as indicated by the solid line in FIG. 15. The portion of the coating to be removed from the optical fiber 1 mounted on the heater 42 can thereby be satisfactorily heated and softened extremely rapidly, and the coating 1b at the end portion of the optical fiber 1 can be smoothly and satisfactorily removed to expose the glass fiber 1a.

In contrast, in a structure in which a space is not provided between the case 12a and the heater supporting member 43, and since the lateral ribs 61 are not formed on both sides of the heater supporting member 43, both sides of the heater supporting member 43 are in significant contact with the inside surfaces of the lateral walls 51b of the recessed receiving portion 51 in the case 12a, and the heat of the heater 42 is transmitted to the case 12a via the heater supporting member 43. In such a structure, only the center portion in the width direction of the heater 42 of the optical fiber heating portion 41 attains a high temperature, as indicated by the dashed line in FIG. 15, and the periphery thereof is at a reduced temperature. Time is therefore required for adequate heating of the portion of the coating that is to be removed from the optical fiber 1 mounted on the heater 42, and power consumption is increased.

Through the optical fiber jacket remover 11 as an embodiment of the present invention, the transfer of heat from the heater 42 to the case 12a can be minimized. It is thereby possible to reduce the time needed for the heater 42 to reach the optimum temperature for removing the coating 1b of the optical fiber 1 after the power supply to the heater 42 is turned on, and low power consumption can be achieved. The pulling force required to remove the coating 1b can be reduced, and the coating 1b can be removed satisfactorily and smoothly without breaking or damaging the optical fiber 1.

In the case that an internal power supply is used, the service life thereof can be increased. This results in enabling prolonged operation and a significant enhancement of working efficiency. Since contact with the lateral walls 51b of the recessed receiving portion 51 of the case 12a is achieved via the lateral ribs 61 formed on both sides of the heater supporting member 43, and since the heat insulating space 55 and the wiring space 56 are sealed and partitioned from the outside in liquid-tight fashion, even when the optical fiber jacket remover 11 is used outdoors, water can be prevented from infiltrating into the heat insulating space 55 and the wiring space 56, and malfunctioning due to water infiltration can be eliminated.

At the portion of the heater supporting member 43 supported by the partitions 65, since only the contacting portion 71 of the heater supporting member 43 contacts the partitions 65, and since a gap with respect to the partitions 65 is formed by the recessed portion 72 below the contacting portion 71, heat transfer from the supporting portions of the partitions 65 to the case 12a can also be minimized. Since the jacket removing portion 31 and the board receiving portion 74 are also partitioned in liquid-tight fashion by the partitions 65, water can be reliably prevented from infiltrating from the side of the jacket removing portion 31 toward the board receiving portion 74 in which the circuit board 77 is housed, and malfunctioning due to adhesion of water on the circuit board 77 can be prevented.

Since the heater supporting member 43 is structured so as to be supported on the lengthwise walls 52, 53 and the widthwise wall 54 provided upright on the bottom part 51a of the recessed receiving portion 51 of the case 12a, heat transfer to the case 12a, from below the heater supporting member 43 can also be minimized. Since the area below the heater supporting member 43 is divided into the heat insulating space 55 and wiring space 56 partitioned from each other in liquid-tight fashion by the lengthwise wall 52 and the widthwise wall 54, and since the wiring 42a connected to the heater 42 is accommodated in the wiring space 56, even in the case that water infiltrates into the heat insulating space 55, the water can be prevented from infiltrating into the wiring space 56 in which the wiring 42a is accommodated. It is thereby possible to prevent malfunctioning due to adhesion of water to the wiring 42a that is connected to the heater 42.

The lateral ribs 61 may be formed on the inside surfaces of the lateral walls 51b of the recessed receiving portion 51, rather than on the heater supporting member 43 side. In the embodiment described above, a case is described of removing the coating 1b of a single-filament optical fiber 1, but the optical fiber jacket remover 11 can also be used for multi-filament optical fibers in which filaments are arranged parallel to each other and integrated.

What is claimed is:

1. An optical fiber jacket remover comprising
   a jacket remover main unit including
      a case having a jacket removing portion formed with a recessed receiving portion including an interior surface,
      a heater supporting member directly attached to the jacket removing portion and housed in the recessed receiving portion, the heater supporting member having a lower surface facing the interior surface of the recessed receiving portion and an upper surface,
      a heater mounted to the heater supporting member, the heater having a first surface facing the upper surface of the heater supporting member and a second surface opposite the first surface being exposed relative to the case,
      an optical fiber presser lid provided to a top portion of the jacket removing portion so as to be movable between an open orientation exposing the second surface of the heater and the heater supporting member and a closed orientation covering the heater supporting member and the second surface of the heater; and
      a blade attached to the jacket removing portion, the heater supporting member including ribs formed on opposite side surfaces thereof, the ribs contacting portions of the interior surface of the recessed receiving portion, the interior surface of the recessed receiving portion of the jacket removing portion, the lower surface of the heater supporting member and the ribs defining an enclosed insulating space within the case between the heater supporting member and the recessed receiving portion; and
   an optical fiber holding portion coupled to the jacket remover main unit for guided movement between a first position adjacent to the jacket remover main unit and a second position spaced apart from the jacket remover main unit,
   the optical fiber holding portion and the jacket remover main unit being configured to draw a glass fiber of an optical fiber out from a coating by cutting the coating with the blade in the vicinity of an end portion of an optical fiber, the optical fiber being retained in the optical fiber holding portion while moving the optical fiber holding portion away from the jacket remover main unit in a state in which the end portion of the optical fiber overlays the second surface of the heater such that the coating is heated by the heater.

2. The optical fiber jacket remover according to claim 1, wherein
   the case includes a board receiving portion for housing a circuit board, and a partition between the jacket removing portion and the board receiving portion; and
   a portion of the heater supporting member is supported by the partition, the heater supporting member includes a contacting portion for contacting the partition, and a recessed portion which forms a gap with respect to the partition, and the jacket removing portion and the board receiving portion are partitioned in liquid-tight fashion by the partition.

3. The optical fiber jacket remover according to claim 1, wherein an upright wall portion is provided on a bottom part of the recessed receiving portion of the case, the heater supporting member being supported on the upright wall portion.

4. The optical fiber jacket remover according to claim 3, wherein the enclosed insulating space is partitioned in liquid-tight fashion by the upright wall portion, and wiring connected to the heater is accommodated in a wiring space at least partially defined by the upright wall portion.

5. The optical fiber jacket remover according to claim 2, wherein an upright wall portion is provided on a bottom part of the recessed receiving portion of the case, the heater supporting member being supported on the upright wall portion.

6. The optical fiber jacket remover according to claim 5, wherein
the enclosed insulating space is partitioned in liquid-tight fashion by the upright wall portion, and wiring connected to the heater is accommodated in a wiring space at least partially defined by the upright wall portion.

* * * * *